United States Patent
Park et al.

(10) Patent No.: US 11,669,266 B2
(45) Date of Patent: Jun. 6, 2023

(54) MEMORY SYSTEM AND OPERATING METHOD OF MEMORY SYSTEM

(71) Applicant: SK hynix Inc., Gyeonggi-do (KR)

(72) Inventors: Sung Jin Park, Gyeonggi-do (KR); Beom Rae Jeong, Gyeonggi-do (KR)

(73) Assignee: SK hynix Inc., Gyeonggi-do (KR)

( * ) Notice: Subject to any disclaimer, the term of this patent is extended or adjusted under 35 U.S.C. 154(b) by 35 days.

(21) Appl. No.: 17/545,464

(22) Filed: Dec. 8, 2021

(65) Prior Publication Data
US 2022/0405007 A1 Dec. 22, 2022

(30) Foreign Application Priority Data
Jun. 16, 2021 (KR) .................. 10-2021-0078338

(51) Int. Cl.
*G06F 3/06* (2006.01)
*G06F 12/02* (2006.01)

(52) U.S. Cl.
CPC .......... *G06F 3/0655* (2013.01); *G06F 3/0625* (2013.01); *G06F 3/0679* (2013.01); *G06F 12/0253* (2013.01); *G06F 2212/7205* (2013.01)

(58) Field of Classification Search
CPC ......... G06F 12/0253; G06F 2212/7205; G06F 3/0625; G06F 3/0655; G06F 3/0679

USPC .................................. 711/154, 103
See application file for complete search history.

(56) References Cited

U.S. PATENT DOCUMENTS

| 9,946,489 B2 * | 4/2018 | Dreyer ................ G06F 3/0647 |
| 10,664,355 B2 * | 5/2020 | Koo ................. G06F 11/1417 |
| 2020/0073753 A1 * | 3/2020 | Kim .................... G06F 11/1068 |
| 2020/0073798 A1 | 3/2020 | Cho |

FOREIGN PATENT DOCUMENTS

| KR | 10-2015-0130638 A | 11/2015 |
| KR | 10-2018-0126118 A | 11/2018 |

* cited by examiner

*Primary Examiner* — Hashem Farrokh
(74) *Attorney, Agent, or Firm* — IP &T Group LLP

(57) ABSTRACT

Embodiments of the present disclosure relate to a memory system and an operating method of the memory system. According to embodiments of the present disclosure, a memory system writes, when performing the sudden power-off recovery operation, a plurality of target segments which are segments most recently written to each of the plurality of open memory blocks among the plurality of memory blocks to a target memory block among the plurality of memory blocks.

17 Claims, 15 Drawing Sheets

SPOR(sudden power off recovery)

① closed block

...

② open block (partial write)
 ---TAR_SG
...
 ---TAR_SG

③ open block (empty)

...

▨ Segment
☐ empty

MEMORY SYSTEM AND OPERATING METHOD OF MEMORY SYSTEM

CROSS-REFERENCE TO RELATED APPLICATION

The present application claims priority under 35 U.S.C. 119(a) to Korean patent application number 10-2021-0078338 filed on Jun. 16, 2021, which is incorporated herein by reference in its entirety.

TECHNICAL FIELD

The embodiments of the present disclosure relate to a memory system and an operating method of the memory system.

BACKGROUND

A memory system includes a data storage device that stores data on the basis of a request from a host, such as a computer, servers, a smartphone, a tablet PC, or other electronic devices. Examples of the memory system span from a traditional magnetic-disk-based hard disk drive (HDD) to a semiconductor-based data storage device such as a solid state drive (SSD), a universal flash storage device (UFS), or an embedded MMC (eMMC) device.

The memory system may include a memory controller for controlling a memory device. The memory controller may receive a command from a host and, on the basis of the received command, may execute the command or control operations (e.g., read, write and erase operations) on the memory devices in the memory system. The memory controller may be used to execute firmware operations for performing a logical operation for controlling such operations.

If an abnormality occurs in the power supplied to the memory system while operating the memory system, there may occur a power-off in the memory system. When a sudden power-off occurs in the memory system, the memory system may perform a recovery operation for the sudden power-off, e.g., a sudden power-off recovery (SPOR) when power is applied again thereafter.

SUMMARY

Embodiments of the present disclosure may provide a memory system and an operating method of the memory system capable of preventing a sudden increase in the time required for a sudden power-off recovery operation.

In addition, embodiments of the present disclosure may provide a memory system and an operating method of the memory system capable of preventing memory block exhaustion due to consecutive sudden power-offs (SPO).

In one aspect, embodiments of the present disclosure may provide a memory system including a memory device including a plurality of memory blocks, and a memory controller configured to control the memory device.

The memory controller may select, when performing a sudden power-off recovery operation, a plurality of open memory blocks from among the plurality of memory blocks, wherein one or more segments are written to in each of the plurality of open memory blocks.

In addition, the memory controller may write a plurality of target segments to a target memory block among the plurality of memory blocks, the plurality of target segments being segments most recently written to each of the plurality of open memory blocks.

In another aspect, embodiments of the present disclosure may provide an operating method of a memory system including a memory device including a plurality of memory blocks.

The operating method of the memory system may include selecting, when performing a sudden power-off recovery operation, a plurality of open memory blocks to each of which one or more segments was being written to, from among the plurality of memory blocks.

The operating method of the memory system may include determining a plurality of target segments, which are segments most recently written to each of the plurality of open memory blocks.

The operating method of the memory system may include determining, from among the plurality of memory blocks, a target memory block to which the plurality of target segments are to be written.

The operating method of the memory system may include writing the plurality of target segments to the target memory block.

According to embodiments of the present disclosure, it is possible to prevent an issue of a sudden increase in the time required for the sudden power-off recovery operation, and also to prevent memory block exhaustion caused by consecutive sudden power-offs.

DETAILED DESCRIPTION

Figure 1:
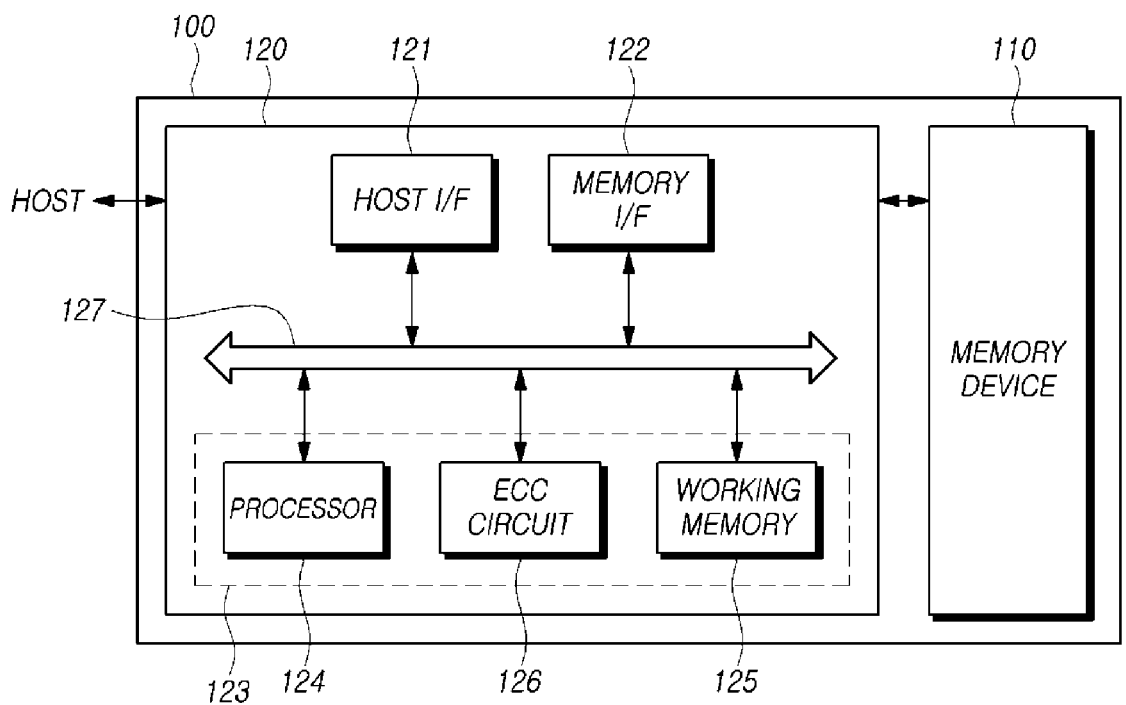
FIG. 1 is a schematic diagram illustrating a configuration of a memory system based on an embodiment of the disclosed technology.

Hereinafter, embodiments of the present disclosure are described in detail with reference to the accompanying drawings. Throughout the specification, reference to "an embodiment," "another embodiment" or the like is not necessarily to only one embodiment, and different references to any such phrase are not necessarily to the same embodiment(s). The term "embodiments" when used herein does not necessarily refer to all embodiments.

Various embodiments of the present invention are described below in more detail with reference to the accompanying drawings. We note, however, that the present invention may be embodied in different forms and variations, and should not be construed as being limited to the embodiments set forth herein. Rather, the described embodiments are provided so that this disclosure will be thorough and complete, and will fully convey the present invention to those skilled in the art to which this invention pertains. Throughout the disclosure, like reference numerals refer to like parts throughout the various figures and embodiments of the present invention.

The methods, processes, and/or operations described herein may be performed by code or instructions to be executed by a computer, processor, controller, or other signal processing device. The computer, processor, controller, or other signal processing device may be those described herein or in addition to the elements described herein. Because the algorithms that form the basis of the methods (or operations of the computer, processor, controller, or other signal processing device) are described in detail, the code or instructions for implementing the operations of the method embodiments may transform the computer, processor, controller, or other signal processing device into a special-purpose processor for performing methods herein.

When implemented at least partially in software, the controllers, processors, devices, modules, units, multiplexers, generators, logic, interfaces, decoders, drivers, generators and other signal generating and signal processing features may include, for example, a memory or other storage device for storing code or instructions to be executed, for example, by a computer, processor, microprocessor, controller, or other signal processing device.

FIG. 1 is a diagram illustrating the schematic configuration of a memory system 100 based on an embodiment of the disclosed technology.

In some implementations, the memory system 100 may include a memory device 110 configured to store data, and a memory controller 120 configured to control the memory device 110.

The memory device 110 may include multiple memory blocks each including a plurality of memory cells for storing data. The memory device 110 may be configured to operate in response to control signals received from the memory controller 120. Operations of the memory device 110 may include, for example, a read operation, a program operation (also referred to as a "write operation"), an erase operation, and the like.

The memory cells in the memory device 110 are used to store data and may be arranged in a memory cell array. The memory cell array may be divided into memory blocks of memory cells and each block includes different pages of memory cells. In typical implementations of NAND flash memory devices, a page of memory cells is the smallest memory unit that can be programmed or written to, and the data stored in memory cells can be erased at the block level.

In some implementations, the memory device 110 may be implemented as various types, such as a double data rate synchronous dynamic random access memory (DDR SDRAM), a low power double data rate4 (LPDDR4) SDRAM, a graphics double data rate (GDDR) SDRAM, a low power DDR (LPDDR), a Rambus dynamic random access memory (RDRAM), a NAND flash memory, a vertical NAND flash memory, a NOR flash memory, a resistive random access memory (RRAM), a phase-change random access memory (PRAM), a magnetoresistive random access memory (MRAM), a ferroelectric random access memory (FRAM), or a spin transfer torque random access memory (STT-RAM).

The memory device 110 may be implemented in a three-dimensional array structure. Some embodiments of the disclosed technology are applicable to any type of flash memory devices having an electric charge storage layer. In an implementation, the electric charge storage layer may be formed of a conductive material, and such an electric charge storage layer can be called a floating gate. In another implementation, the electric charge storage layer may be formed of an insulating material, and such a flash memory device can be called a charge trap flash (CTF).

The memory device 110 may be configured to receive a command and an address from the memory controller 120 to access an area of the memory cell array selected using the address. That is, the memory device 110 may perform an operation corresponding to the received command on a memory area of the memory device having a physical address corresponding to the received address from the memory controller 120.

In some implementations, the memory device 110 may perform a program operation, a read operation, an erase operation, and the like. During the program operation, the memory device 110 may write data in the area selected by the address. During the read operation, the memory device 110 may read data from a memory area selected by the address. During the erase operation, the memory device 110 may erase data stored in a memory area selected by the address.

The memory controller 120 may control write (program), read, erase, and background operations that are performed on the memory device 110. The background operation may include, for example, operations that are implemented to optimize the overall performance of the memory device 110, such as a garbage collection (GC) operation, a wear leveling (WL) operation, and a bad block management (BBM) operation.

The memory controller 120 may control the operation of the memory device 110 at the request of a host. Alternatively, the memory controller 120 may control the operation of the memory device 110 even in absence of request from the host when it performs such background operations on the memory device 110.

The memory controller 120 and the host may be separate devices. In some implementations, the memory controller 120 and the host may be integrated and implemented as a single device. In the following description, the memory controller 120 and the host will be discussed as separate devices as an example.

Referring to FIG. 1, the memory controller 120 may include a host interface (I/F) 121, a memory interface 122 and a control circuit 123.

The host interface 121 may be configured to provide an interface for communication with the host.

When receiving a command from the host, the control circuit 123 may receive the command through the host interface 121 and may perform an operation of processing the received command.

The memory interface 122 may be directly or indirectly connected to the memory device 110 to provide an interface for communication with the memory device 110. That is, the memory interface 122 may be configured to provide the memory device 110 and the memory controller 120 with an interface for the memory controller 120 to perform memory operations on the memory device 110 based on control signals and instructions from the control circuit 123.

The control circuit 123 may be configured to control the operation of the memory device 110 through the memory controller 120. For example, the control circuit 123 may include a processor 124 and a working memory 125. The control circuit 123 may further include an error detection/correction circuit (ECC circuit) 126 and the like.

The processor 124 may control the overall operation of the memory controller 120. The processor 124 may perform a logical operation. The processor 124 may communicate with the host through the host interface 121. The processor 124 may communicate with the memory device 110 through the memory interface 122.

The processor 124 may be used to perform operations associated with a flash translation layer (FTL) to effectively manage the memory operations on the memory system 100. The processor 124 may translate a logical block address (LBA) provided by the host into a physical block address (PBA) through the FTL. The FTL may receive the LBA and translate the LBA into the PBA by using a mapping table.

There are various address mapping methods which may be employed by the FTL, based on the mapping unit. Typical address mapping methods may include a page mapping method, a block mapping method, and a hybrid mapping method.

The processor 124 may be configured to randomize data received from the host to write the randomized data to the memory cell array. For example, the processor 124 may randomize data received from the host by using a randomizing seed. The randomized data is provided to the memory device 110 and written to the memory cell array.

The processor 124 may be configured to derandomize data received from the memory device 110 during a read operation. For example, the processor 124 may derandomize data received from the memory device 110 by using a derandomizing seed. The derandomized data may be output to the host.

The processor 124 may execute firmware (FW), to control the operation of the memory controller 120. In other words, the processor 124 may control the overall operation of the memory controller 120 and, in order to perform a logical operation, may execute (drive) firmware loaded into the working memory 125 during booting.

The firmware refers to a program or software stored on a certain nonvolatile memory and is executed inside the memory system 100.

In some implementations, the firmware may include various functional layers. For example, the firmware may include at least one of a flash translation layer (FTL) configured to translate a logical address in requests from the host to a physical address of the memory device 110, a host interface layer (HIL) configured to interpret a command that the host issues to a data storage device such as the memory system 100 and to deliver the command to the FTL, and a flash interface layer (FIL) configured to deliver a command issued by the FTL to the memory device 110.

For example, the firmware may be stored in the memory device 110, and then loaded into the working memory 125.

The working memory 125 may store firmware, program codes, commands, or pieces of data necessary to operate the memory controller 120. The working memory 125 may include, for example, at least one of a static RAM (SRAM), a dynamic RAM (DRAM), and a synchronous RAM (SDRAM) as a volatile memory.

The error detection/correction circuit 126 may be configured to detect and correct one or more erroneous bits in the data by using an error detection and correction code. In some implementations, the data that is subject to the error detection and correction may include data stored in the working memory 125, and data retrieved from the memory device 110.

The error detection/correction circuit 126 may be implemented to decode data by using the error correction code. The error detection/correction circuit 126 may be implemented by using various decoding schemes. For example, a decoder that performs nonsystematic code decoding or a decoder that performs systematic code decoding may be used.

In some implementations, the error detection/correction circuit 126 may detect one or more erroneous bits on a sector basis. That is, each piece of read data may include multiple sectors. In the present disclosure, a sector may refer to a data unit that is smaller than the read unit (e.g., page) of a flash memory. Sectors constituting each piece of read data may be mapped based on addresses.

In some implementations, the error detection/correction circuit 126 may calculate a bit error rate (BER) and determine whether the number of erroneous bits in the data is within the error correction capability sector by sector. For example, if the BER is greater than a reference value, the error detection/correction circuit 126 may determine that the erroneous bits in the corresponding sector are uncorrectable and the corresponding sector is marked "fail." If the BER less than or equals to the reference value, the error detection/correction circuit 126 may determine that the corresponding sector is correctable or the corresponding sector can be marked "pass."

The error detection/correction circuit 126 may perform error detection and correction operations successively on all read data. When a sector included in the read data is correctable, the error detection/correction circuit 126 may move on to the next sector to check whether an error correction operation is needed on the next sector. Upon completion of the error detection and correction operations on all of the read data in this manner, the error detection/correction circuit 126 may acquire information as to which sector is deemed uncorrectable in the read data. The error detection/correction circuit 126 may provide such information (e.g., address of uncorrectable bits) to the processor 124.

The memory system 100 may also include a bus 127 to provide a channel between the constituent elements 121, 122, 124, 125, and 126 of the memory controller 120. The bus 127 may include, for example, a control bus for delivering various types of control signals and commands, and a data bus for delivering various types of data.

By way of example, FIG. 1 illustrates the above-mentioned constituent elements 121, 122, 124, 125, and 126 of the memory controller 120. It is noted that some of those illustrated in the drawings may be omitted, or some of the above-mentioned constituent elements 121, 122, 124, 125, and 126 of the memory controller 120 may be integrated into a single element. In addition, in some implementations, one or more other constituent elements may be added to the above-mentioned constituent elements of the memory controller 120.

Figure 2:
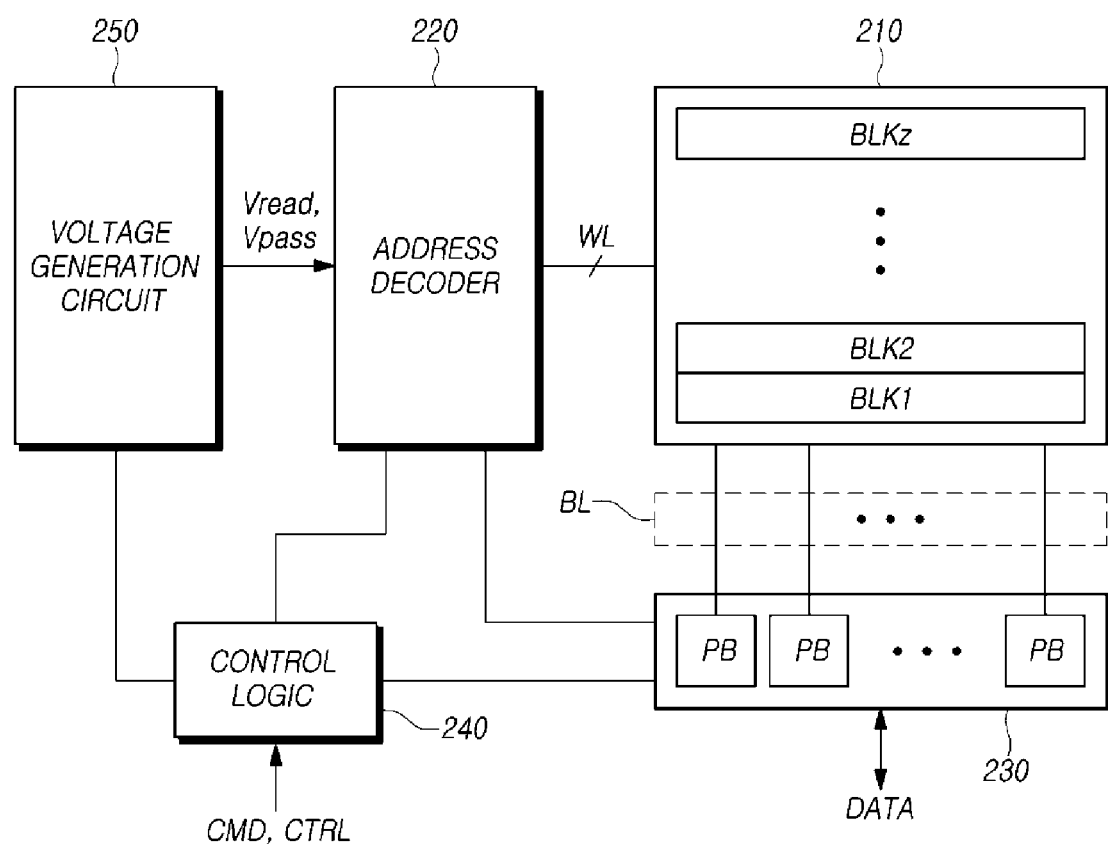
FIG. 2 is a block diagram schematically illustrating a memory device based on an embodiment of the disclosed technology.

FIG. 2 is a block diagram schematically illustrating a memory device 110 based on an embodiment of the disclosed technology.

In some implementations, the memory device 110 may include a memory cell array 210, an address decoder 220, a read/write circuit 230, a control logic 240, and a voltage generation circuit 250.

The memory cell array 210 may include multiple memory blocks BLK1-BLKz, where z is a natural number greater than or equal to 2.

In the multiple memory blocks BLK1-BLKz, multiple word lines WL and multiple bit lines BL may be disposed in rows and columns, and multiple memory cells MC may be arranged.

The multiple memory blocks BLK1-BLKz may be connected to the address decoder 220 through the multiple word lines WL. The multiple memory blocks BLK1-BLKz may be connected to the read/write circuit 230 through the multiple bit lines BL.

Each of the multiple memory blocks BLK1-BLKz may include multiple memory cells. For example, the multiple memory cells are nonvolatile memory cells. In some implementations, such nonvolatile memory cells may be arranged in a vertical channel structure.

The memory cell array 210 may be configured as a memory cell array having a two-dimensional structure. In some implementations, the memory cell array 210 may be arranged in a three-dimensional structure.

Each of the multiple memory cells included in the memory cell array 210 may store at least one bit of data. For example, each of the multiple memory cells included in the memory cell array 210 may be a single-level cell (SLC) configured to store one bit of data. In another example, each of the multiple memory cells included in the memory cell array 210 may be a multi-level cell (MLC) configured to store two bits of data per memory cell. In another example, each of the multiple memory cells included in the memory cell array 210 may be a triple-level cell (TLC) configured to store three bits of data per memory cell. In another example, each of the multiple memory cells included in the memory cell array 210 may be a quad-level cell (QLC) configured to store four bits of data per memory cell. In another example, the memory cell array 210 may include multiple memory cells, each of which may be configured to store at least five bits of data per memory cell.

Referring to FIG. 2, the address decoder 220, the read/write circuit 230, the control logic 240, and the voltage generation circuit 250 may operate as peripheral circuits configured to drive the memory cell array 210.

The address decoder 220 may be connected to the memory cell array 210 through the multiple word lines WL.

The address decoder 220 may be configured to operate in response to command and control signals of the control logic 240.

The address decoder 220 may receive addresses through an input/output buffer inside the memory device 110. The address decoder 220 may be configured to decode a block address among the received addresses. The address decoder 220 may select at least one memory block based on the decoded block address.

The address decoder 220 may receive a read voltage Vread and a pass voltage Vpass from the voltage generation circuit 250.

The address decoder 220 may, during a read operation, apply the read voltage Vread to a selected word line WL inside a selected memory block and apply the pass voltage Vpass to the remaining non-selected word lines WL.

The address decoder 220 may apply a verification voltage generated by the voltage generation circuit 250 to a selected word line WL inside a selected memory block, during a program verification operation, and may apply the pass voltage Vpass to the remaining non-selected word lines WL.

The address decoder 220 may be configured to decode a column address among the received addresses. The address decoder 220 may transmit the decoded column address to the read/write circuit 230.

The memory device 110 may perform the read operation and the program operation page by page. Addresses received when the read operation and the program operation are requested may include at least one of a block address, a row address, and a column address.

The address decoder 220 may select one memory block and one word line based on the block address and the row address. The column address may be decoded by the address decoder 220 and provided to the read/write circuit 230.

The address decoder 220 may include at least one of a block decoder, a row decoder, a column decoder, and an address buffer.

The read/write circuit 230 may include multiple page buffers PB. The read/write circuit 230 may operate as a "read circuit" when a read operation is performed on the memory cell array 210, and may operate as a "write circuit" when a write operation is performed on the memory cell array 210.

The above-mentioned read/write circuit 230 is also referred to as a page buffer circuit including multiple page buffers PB, or a data register circuit. The read/write circuit 230 may include a data buffer that participates in a data processing function and, in some implementations, may further include a cache buffer for data caching.

The multiple page buffers PB may be connected to the memory cell array 210 through the multiple bit lines BL. In order to detect or sense the threshold voltage Vth of the memory cells during a read operation and a program verification operation, the multiple page buffers PB may continuously supply a sensing current to the bit lines BL connected to the memory cells to detect, at a sensing node, a change proportional to the amount of current that varies depending on the program state of a corresponding memory cell, and may hold or latch the corresponding voltage as sensing data.

The read/write circuit 230 may operate in response to page buffer control signals output from the control logic 240.

During a read operation, the read/write circuit 230 senses a voltage value of a memory cell and the voltage value is read out as data. The read/write circuit 230 temporarily stores the retrieved data, and outputs the data DATA to the input/output buffer of the memory device 110. In an embodiment, the read/write circuit 230 may include a column selection circuit, in addition to the page buffers PB or page registers.

The control logic 240 may be connected to the address decoder 220, the read/write circuit 230, and the voltage generation circuit 250. The control logic 240 may receive a command CMD and a control signal CTRL through the input/output buffer of the memory device 110.

The control logic 240 may be configured to control the overall operation of the memory device 110 in response to the control signal CTRL. The control logic 240 may output a control signal for adjusting the voltage level of sensing nodes of multiple page buffers PB to a pre-charge voltage level.

The control logic 240 may control the read/write circuit 230 to perform a read operation in the memory cell array 210. The voltage generation circuit 250 may generate a read voltage Vread and a pass voltage Vpass, which are used during the read operation, in response to a voltage generation circuit control signal output from the control logic 240.

A memory block BLK included in the memory device 110 may include multiple pages PG. In some implementations, a plurality of memory cells arranged in columns form memory cell strings, and a plurality of memory cells arranged in rows form memory blocks. Each of the multiple pages PG is coupled to one of word lines WL, and each of the memory cell strings STR is coupled to one of bit lines BL.

In the memory block BLK, multiple word lines WL and multiple bit lines BL may be arranged in rows and columns. For example, each of the multiple word lines WL may be arranged in the row direction, and each of the multiple bit lines BL may be arranged in the column direction. In another example, each of the multiple word lines WL may be arranged in the column direction, and each of the multiple bit lines BL may be arranged in the row direction.

In some implementations, the multiple word lines WL and the multiple bit lines BL may intersect with each other, thereby addressing a single memory cell in the array of multiple memory cells MC. In some implementations, each memory cell MC may include a transistor TR that includes a material layer that can hold an electrical charge.

For example, the transistor TR arranged in each memory cell MC may include a drain, a source, and a gate. The drain (or source) of the transistor TR may be connected to the corresponding bit line BL directly or via another transistor TR. The source (or drain) of the transistor TR may be connected to the source line (which may be the ground) directly or via another transistor TR. The gate of the transistor TR may include a floating gate (FG) surrounded by an insulator, and a control gate (CG) to which a gate voltage is applied from a word line WL.

In each of the multiple memory blocks BLK1-BLKz, a first selection line (also referred to as a source selection line or a drain selection line) may be additionally arranged outside the first outermost word line, which is closer to the read/write circuit 230 among two outermost word lines, and a second selection line (also referred to as a drain selection line or a source selection line) may be additionally arranged outside the other second outermost word line.

In some implementations, at least one dummy word line may be additionally arranged between the first outermost word line and the first selection line. In addition, at least one dummy word line may be additionally arranged between the second outermost word line and the second selection line.

A read operation and a program operation (write operation) of the memory block may be performed page by page, and an erase operation may be performed memory block by memory block.

Figure 3:
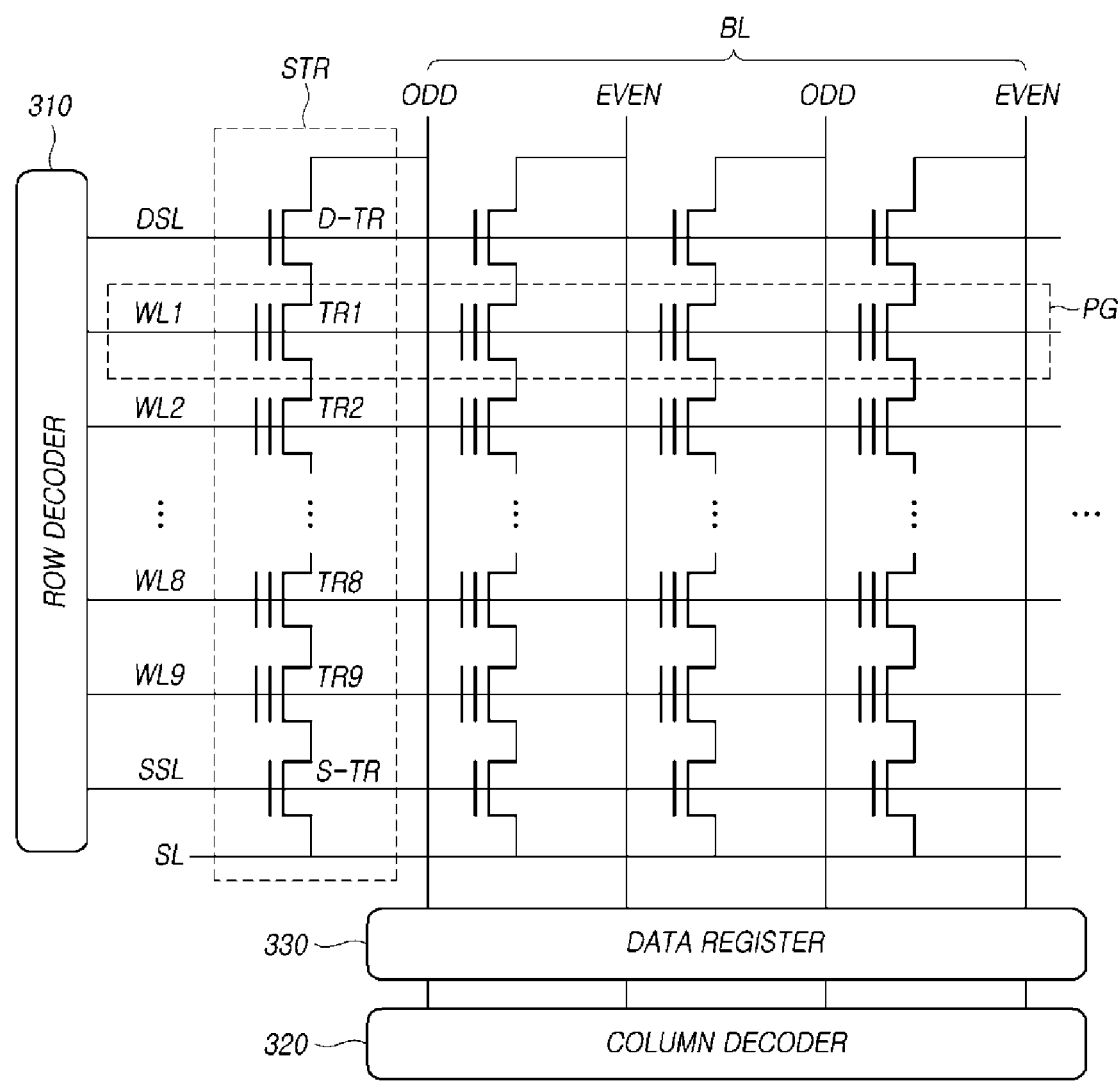
FIG. 3 illustrates a structure of word lines and bit lines of a memory device based on an embodiment of the disclosed technology.

FIG. 3 is a diagram illustrating a structure of word lines WL and bit lines BL of a memory device 110 based on an embodiment of the disclosed technology.

Referring to FIG. 3, the memory device 110 has a core area in which memory cells MC are arranged, and an auxiliary area (the remaining area other than the core area) which includes circuitry that is used to perform the operations of the memory cell array 210.

In the core area, a certain number of memory cells arranged in one direction can be called "page" PG, and a certain number of memory cells that are coupled in series can be called "memory cell string" STR.

The word lines WL1-WL9 may be connected to a row decoder 310. The bit lines BL may be connected to a column decoder 320. A data register 330, which corresponds to the read/write circuit 230 of FIG. 2, may exist between the multiple bit lines BL and the column decoder 320.

The multiple word lines WL1-WL9 may correspond to multiple pages PG.

For example, each of the multiple word lines WL1-WL9 may correspond to one page PG as illustrated in FIG. 3. When each of the multiple word lines WL1-WL9 has a large size, each of the multiple word lines WL1-WL9 may correspond to at least two (e.g., two or four) pages PG. Each page PG is the smallest unit in a program operation and a read operation, and all memory cells MC within the same page PG may perform simultaneous operations when performing a program operation and a read operation.

The multiple bit lines BL may be connected to the column decoder 320. In some implementations, the multiple bit lines BL may be divided into odd-numbered bit lines BL and even-numbered bit lines BL such that a pair of an odd-numbered bit line and an even-numbered bit line is coupled in common to the column decoder 320.

In accessing a memory cell MC, the row decoder 310 and the column decoder 320 are used to locate a desired memory cell based on the address.

In some implementations, the data register 330 plays an important role because all data processing by the memory device 110, including program and read operations, occurs via the data register 330. If data processing by the data register 330 is delayed, all of the other areas need to wait until the data register 330 finishes the data processing, degrading the overall performance of the memory device 110.

Referring to the example illustrated in FIG. 3, in one memory cell string STR, multiple transistors TR1-TR9 may be connected to multiple word lines WL1-WL9, respectively. In some implementations, the multiple transistors TR1-TR9 correspond to memory cells MC. In this example, the multiple transistors TR1-TR9 include control gates CG and floating gates FG.

The multiple word lines WL1-WL9 include two outermost word lines WL1 and WL9. A first selection line DSL may be additionally arranged outside the first outermost word line WL1, which is closer to the data register 330 and has a shorter signal path compared to the other outermost word line WL9. A second selection line SSL may be additionally arranged outside the other second outermost word line WL9.

The first selection transistor D-TR, which is controlled to turn on/off by the first selection line DSL, has a gate electrode connected to the first selection line DSL, but includes no floating gate FG. The second selection transistor S-TR, which is controlled to turn on/off by the second selection line SSL, has a gate electrode connected to the second selection line SSL, but includes no floating gate FG.

The first selection transistor D-TR is used as a switch circuit that connects the corresponding memory cell string STR to the data register 330. The second selection transistor S-TR is used as a switch that connects the corresponding memory cell string STR to the source line SL. That is, the first selection transistor D-TR and the second selection transistor S-TR can be used to enable or disable the corresponding memory cell string STR.

In some implementations, the memory system 100 applies a predetermined turn-on voltage Vcc to the gate electrode of the first selection transistor D-TR, thereby turning on the first selection transistor D-TR, and applies a predetermined turn-off voltage (e.g., 0V) to the gate electrode of the second selection transistor S-TR, thereby turning off the second selection transistor S-TR.

The memory system 100 turns on both of the first and second selection transistors D-TR and S-TR during a read operation or a verification operation. Accordingly, during a read operation or a verification operation, an electric current may flow through the corresponding memory cell string STR and drain to the source line SL, which corresponds to the ground, such that the voltage level of the bit line BL can be measured. However, during a read operation, there may be a time difference in the on/off timing between the first selection transistor D-TR and the second selection transistor S-TR.

The memory system 100 may apply a predetermined voltage (e.g., +20V) to the substrate through a source line SL during an erase operation. The memory system 100 applies a certain voltage to allow both the first selection transistor D-TR and the second selection transistor S-TR to float during an erase operation. As a result, the applied erase voltage can remove electrical charges from the floating gates FG of the selected memory cells.

Figure 4:
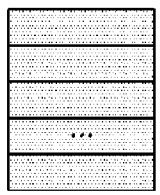
FIG. 4 illustrates an operation of determining a target segment by a memory system according to embodiments of the present disclosure.
Figure 4:
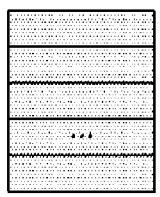
Figure 4:
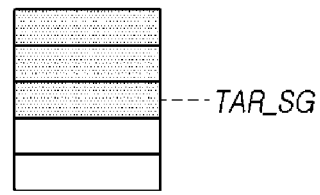
Figure 4:
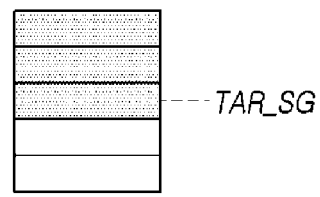
Figure 4:
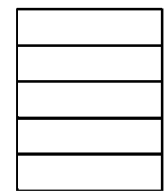
Figure 4:
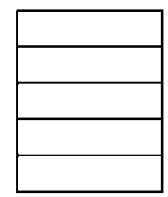

FIG. 4 illustrates an operation of determining a target segment TAR_SG by a memory system 100 according to embodiments of the present disclosure.

Referring to FIG. 4, when performing a sudden power-off recovery (SPOR) operation, a memory controller 120 of the memory system 100 may select a plurality of open memory blocks in which one or more segments are written, respectively, from among the plurality of memory blocks.

In addition, the memory controller 120 may determine a target segment TAR_SG, which is the segment most recently written to each of the plurality of selected open memory blocks. In this case, the segment means data of a preset unit size (e.g. a page).

In the case that a sudden power-off occurs, the memory blocks included in the memory device 110 may be, ① a closed memory block in which segments are written to all areas included in the memory block, ② a partial write open memory block in which one or more segments are written to a partial area included in the memory block, or ③ an empty open memory block in which segments are not written in any area constituting the memory block. The memory controller 120 may select an open memory block in which one or more segments are written in a partial area included in a memory block, i.e., ② the partial write open memory block.

When executing the sudden power-off recovery (SPOR) operation, in order to guarantee the reliability of the last written segment to the corresponding open memory block, the memory controller 120 of the memory system 100 may write the corresponding segment to another memory block with respect to an open memory block in which one or more segments are written in a partial area included in the memory block. This is to prevent the last segment written to the corresponding open memory block from being in an unstable state due to the sudden power-off.

Accordingly, for each open memory block in which a segment is written to only a partial area included in the memory block, the memory controller 120 may determine the most recently written data segment among the segments written to the corresponding open memory block as the target segment TAR_SG.

If there are N open memory blocks, where N is a natural number greater than or equal to 2, in which segments are written in only a partial area included in the memory block, the number of target segments TAR_SG is also N.

Figure 5:
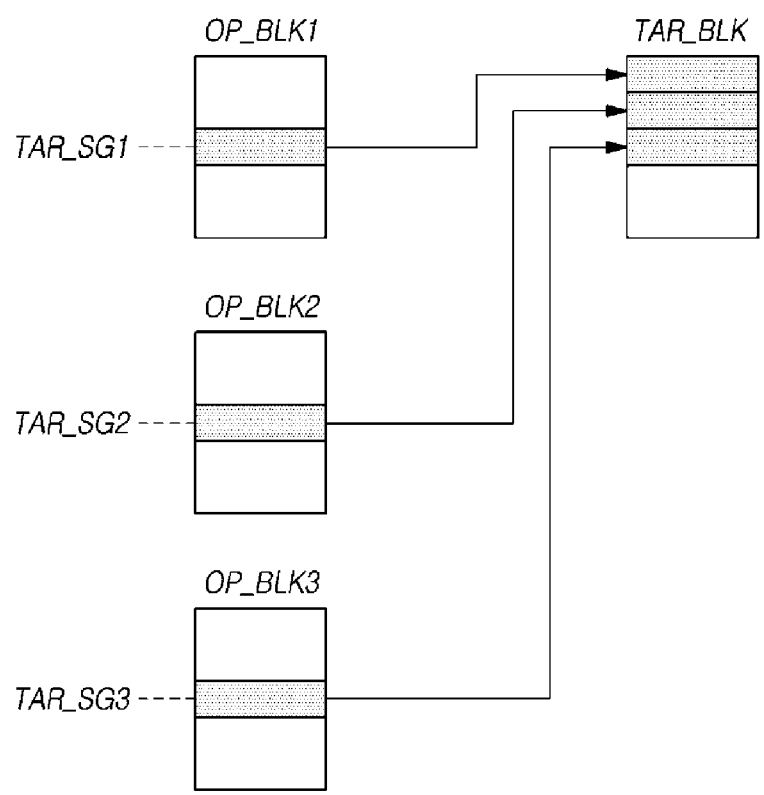
FIG. 5 illustrates an operation of writing a plurality of target segments to a target memory block by a memory system according to embodiments of the present disclosure.

FIG. 5 illustrates an operation of writing a plurality of target segments TAR_SG1, TAR_SG2, TAR_SG3 to a target memory block TAR_BLK by a memory system 100 according to embodiments of the present disclosure.

Referring to FIG. 5, when performing the sudden power-off recovery operation, the memory controller 120 of the memory system 100 may write the plurality of target segments TAR_SG1, TAR_SG2 and TAR_SG3 to a target memory block TAR_BLK among the plurality of memory blocks included in the memory device 110.

In the illustrated example of FIG. 5, the memory controller 120 may write target segments written in a first open memory block OP_BLK1, a second open memory block OP_BLK2, and a third open memory block OP_BLK3, to the target memory block TAR_BLK.

The memory controller 120 may write a first target segment TAR_SG1 written in the first open memory block OP_BLK1 to the target memory block TAR_BLK.

Also, the memory controller 120 may write a second target segment TAR_SG2 written in the second open memory block OP_BLK2 to the target memory block TAR_BLK.

In addition, the memory controller 120 may write a third target segment TAR_SG3 written in the third open memory block OP_BLK3 to the target memory block TAR_BLK.

A reason why the memory controller 120 writes the plurality of target segments TAR_SG1, TAR_SG2, and TAR_SG3 to the target memory block TAR_BLK when performing the sudden power-off recovery operation is described below.

In the case that the memory controller 120 writes one target segment to a memory block, if there is no free memory area for writing the target segment in the memory block to which the target segment will be written, there may be a case in which the memory block to which the target segment is to be written is required to be erased.

Accordingly, in the case that the memory controller 120 writes each of the plurality of target segments to different memory blocks, in the worst case, there may be a case in which memory blocks corresponding to the number of the plurality of target segments have to be erased. In this case, there may be an issue in that the time required for the sudden power-off recovery operation is rapidly increased. The host, in general, requests that a rebuild operation be completed within a preset time limit when the memory system 100 is powered on again after a sudden power-off occurs. Accordingly, if the time required for the sudden power-off recovery operation increases rapidly, the memory system 100 may not satisfy the above-described host requirements.

In addition, in the case that the memory controller 120 writes each of the plurality of target segments to different memory blocks, in order to write the plurality of target segments, in the worst case, the number of free memory blocks may be reduced by the number of the plurality of target segments. Accordingly, if the power-off continuously occurs in the memory system 100, there may occur a runout of spare (ROS) phenomenon in which a memory block capable of writing data is exhausted.

Accordingly, the memory controller 120 may write a plurality of target segments to the same target memory block TAR_BLK when performing the sudden power-off recovery operation. Therefore, it is possible to prevent an issue in that the time required for the sudden power-off recovery operation is rapidly increased due to the operation of erasing the memory block, and to prevent the memory block capable of writing data from being exhausted during consecutive sudden power-offs.

Figure 6:
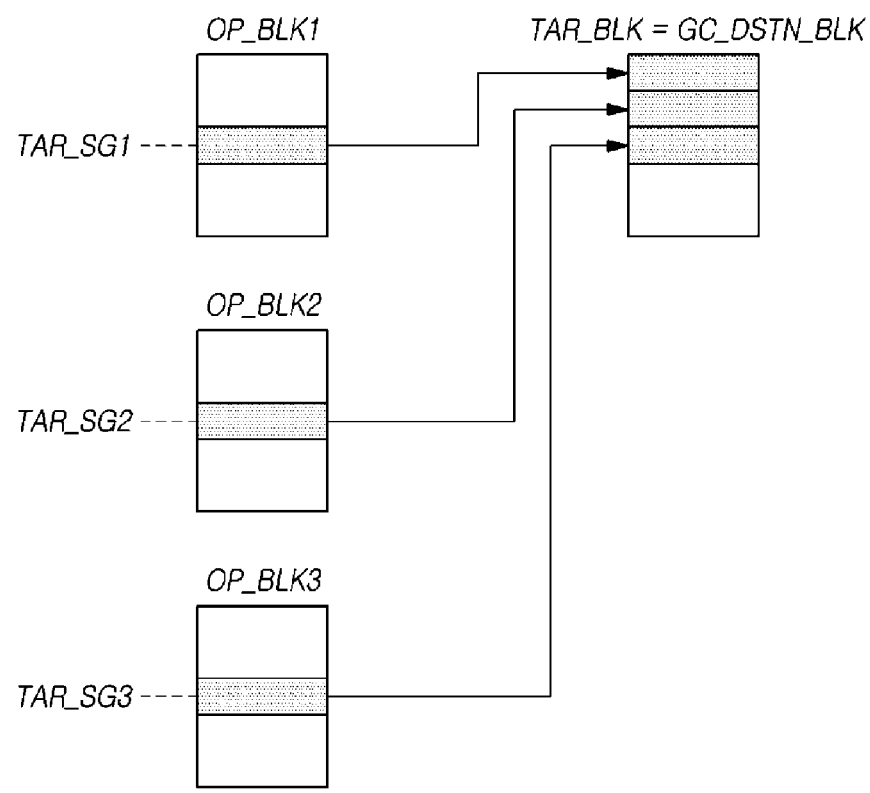
FIG. 6 illustrates an example of a target memory block described with reference to FIG. 5 according to embodiments of the present disclosure.

FIG. 6 illustrates an example of a target memory block TAR_BLK described with reference to FIG. 5 according to embodiments of the present disclosure.

Referring to FIG. 6, a memory controller 120 of a memory system 100 may set the target memory block TAR_BLK as a garbage collection destination block GC_DSTN_BLK, which is a target to which valid data is written when performing a garbage collection operation. In this case, the memory controller 120 may write the plurality of target segments described above with reference to FIG. 5 in addition to the valid data originally written to the garbage collection destination block GC_DSTN_BLK.

As described above, the memory controller 120 may perform a garbage collection operation as a background operation. When performing the garbage collection operation, the memory controller 120 may write valid data to a garbage collection destination block.

In FIG. 6, the memory controller 120 of the memory system 100 may write the plurality of target segments TAR_SG1, TAR_SG2 and TAR_SG3 to the garbage collection destination block GC_DSTN_BLK during the sudden power-off recovery operation. That is, the plurality of target segments TAR_SG1, TAR_SG2 and TAR_SG3 may be written to the garbage collection destination block GC_DSTN_BLK together with the garbage collection data.

Figure 7:
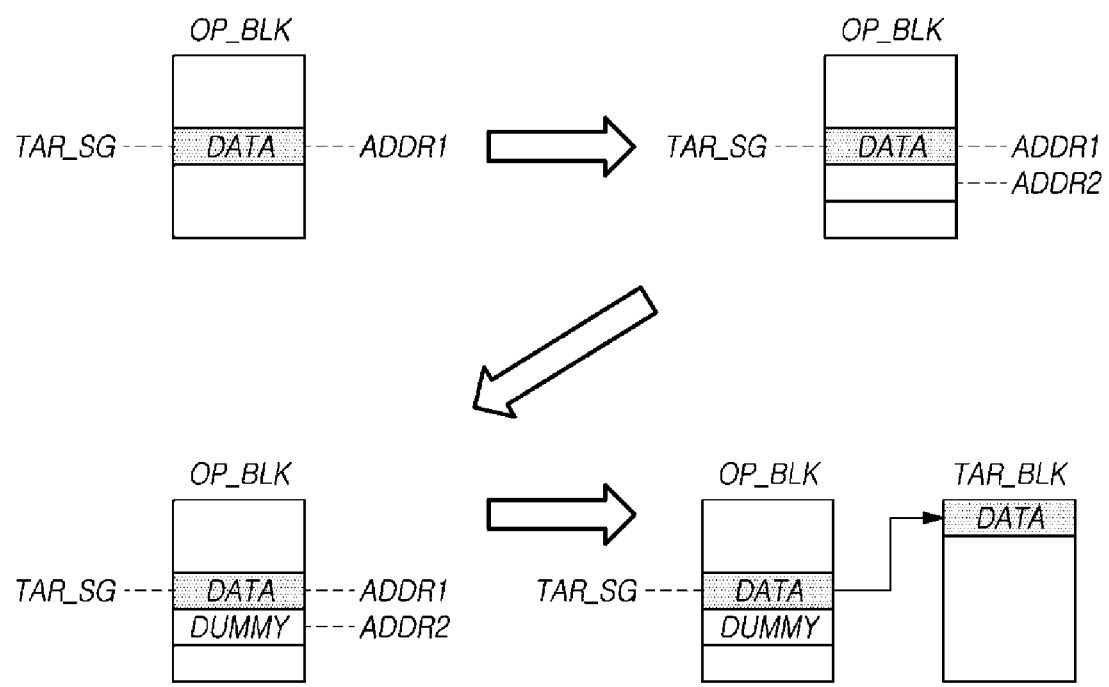
FIG. 7 illustrates an operation of writing dummy data to an open memory block by a memory system according to embodiments of the present disclosure.

FIG. 7 illustrates an operation of writing dummy data DUMMY to an open memory block OP_BLK by a memory system 100 according to embodiments of the present disclosure.

Referring to FIG. 7, the memory controller 120 may write the dummy data DUMMY to the open memory block OP_BLK in which the target segment TAR_SG is stored when the sudden power-off recovery operation is performed. In this case, the dummy data DUMMY is invalid data and is not referenced by the host.

Hereinafter, an example of an operation in which the memory controller 120 writes the dummy data DUMMY to the open memory block OP_BLK is described below.

For example, the memory controller 120 checks an address ADDR1 to which the target segment TAR_SG is written in the open memory block OP_BLK, and may check whether the subsequent address ADDR2 exists in the open memory block OP_BLK. In this case, a word line corresponding to the address ADDR1 to which the target segment TAR_SG is written and a word line corresponding to the subsequent address ADDR2 may be adjacent to each other.

If the subsequent address ADDR2 exists in the open memory block OP_BLK, the memory controller 120 may write the dummy data DUMMY to the subsequent address ADDR2. Thereafter, the memory controller 120 may write the target segment TAR_SG to the target memory block TAR_BLK. However, the memory controller 120 may write the target segment TAR_SG to the target memory block TAR_BLK before writing the dummy data DUMMY.

A reason in which the memory controller 120 additionally writes the dummy data DUMMY to the open memory block OP_BLK storing the target segment TAR_SG is described below.

The sudden power-off may occur while the memory system 100 writes data to the open memory block OP_BLK. Accordingly, there is a possibility that data may not be normally written to an area in which data has been first written in the open memory block OP_BLK after the sudden power-off occurs due to the influence of the write operation that was being performed during the sudden power-off. In this case, there is a possibility that the memory system 100 may malfunction due to data that is not normally written to the corresponding area.

Accordingly, the memory controller 120 writes the dummy data DUMMY to an area in which data may not be normally written in the open memory block OP_BLK, thereby preventing a malfunction of the memory system 100.

Figure 8:
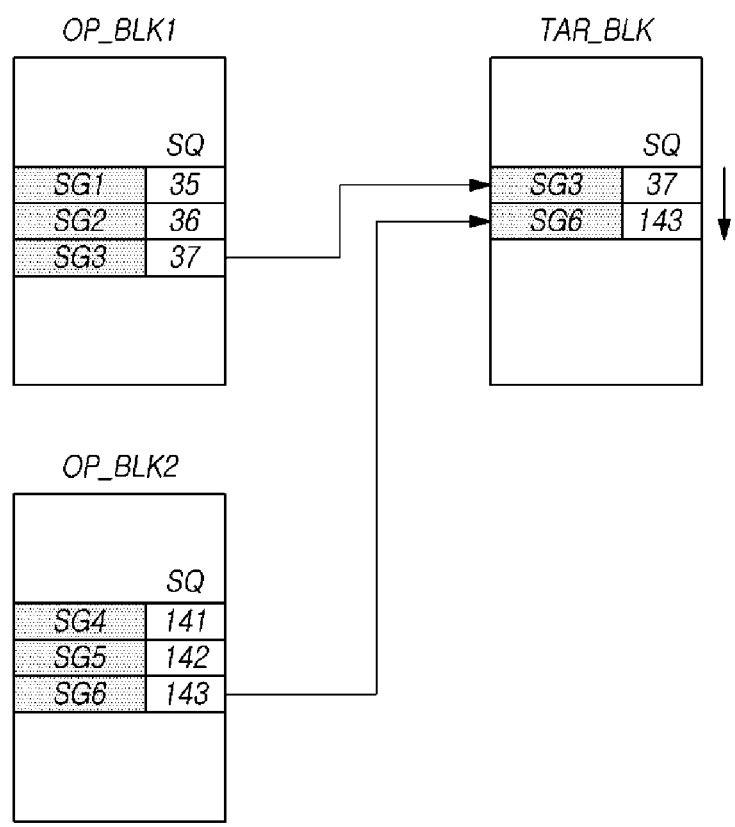
FIG. 8 illustrates an example of an operation in which the memory system writes target segments to a target memory block based on a sequence number according to embodiments of the present disclosure.

FIG. 8 illustrates an example of an operation in which the memory system 100 writes target segments to a target memory block TAR_BLK based on a sequence number SQ according to embodiments of the present disclosure.

In the illustrated example of FIG. 8, the memory controller 120 of the memory system 100 writes the target segments SG3 and SG6 respectively stored in the two open memory blocks OP_BLK1 and OP_BLK2 to the target memory block TAR_BLK.

The memory controller 120 of the memory system 100 may assign a sequence number SQ to each of the plurality of segments SG1, SG2, SG3, SG4, SG5, and SG6 according to the order of being written to the memory device 110.

In the illustrated example of FIG. 8, a sequence number 35 is assigned to a segment SG1, a sequence number 36 is assigned to a segment SG2, a sequence number 37 is assigned to a segment SG3, a sequence number 141 is assigned to a segment SG4, a sequence number 142 is assigned to a segment SG5, and a sequence number 143 is assigned to a segment SG6. In the present disclosure, it has been described the case in which the assigned sequence number increases over time as an example. However, in the present disclosure, a method of assigning a sequence number according to time may be determined in various ways. In an example, the assigned sequence number may decrease as time elapses.

When performing a sudden power off recovery (SPOR) operation, the memory controller 120 may check the sequence numbers SQ corresponding to the target segments SG3 and SG6 that are the recently written data segments for the two open memory blocks OP_BLK1 and OP_BLK2. In FIG. 8, the sequence number SQ corresponding to the target segment SG3 is 37 and the sequence number SQ corresponding to the target segment SG6 is 143.

The memory controller 120 may write the target segments SG3 and SG6 to the target memory block TAR_BLK based on the sequence number SQ. In an example of FIG. 8, according to the ascending order of the sequence number SQ, the target segment SG6 having a relatively large value (i.e., 143) of the sequence number SQ may be written later than the target segment SG3 having a relatively small value (i.e., 37) of the sequence number SQ. However, contrary to that described in FIG. 8, according to the descending order of the sequence number SQ, the target segment SG6 having a relatively large value of the sequence number SQ may be written before writing the target segment SG3 having a relatively small value of the sequence number SQ.

Figure 9:
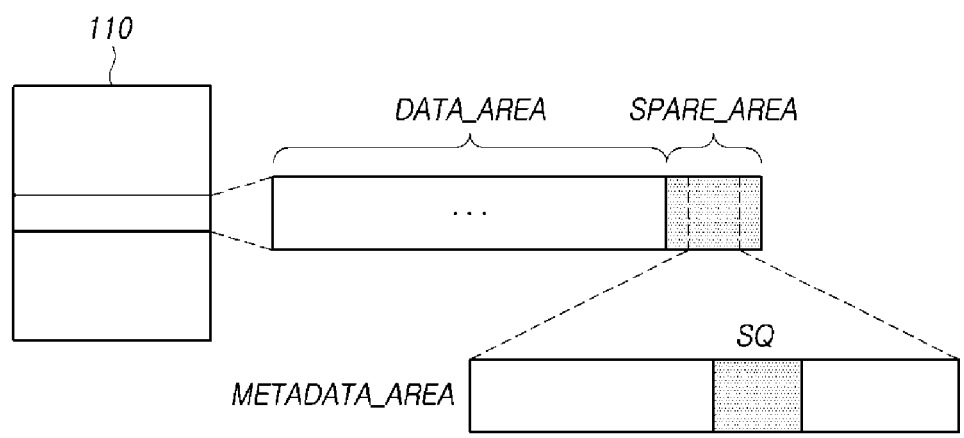
FIG. 9 illustrates an example of a position at which the sequence number described with reference to FIG. 8 is written on a memory device according to embodiments of the present disclosure.

FIG. 9 illustrates an example of a position at which the sequence number SQ described with reference to FIG. 8 is written on a memory device 110 according to embodiments of the present disclosure.

Referring to FIG. 9, the memory controller 120 of the memory system 100 may write the sequence number SQ to a metadata area METADATA_AREA located on a spare area SPARE_AREA of the memory device 110.

The metadata area is an area used to separately store metadata necessary for managing the data written to the memory device 110 from the corresponding data, and may be distinguished from the data area DATA_AREA for storing the corresponding data. The memory controller 120 may record the sequence number SQ assigned to data together with other metadata in the metadata area METADATA_AREA.

During the sudden power-off recovery operation, the memory controller 120 may check the sequence number SQ in the metadata area METADATA_AREA, and may use the sequence number SQ when determining the order of writing the plurality of target segments described above to the target memory block TAR_BLK.

Figure 10:
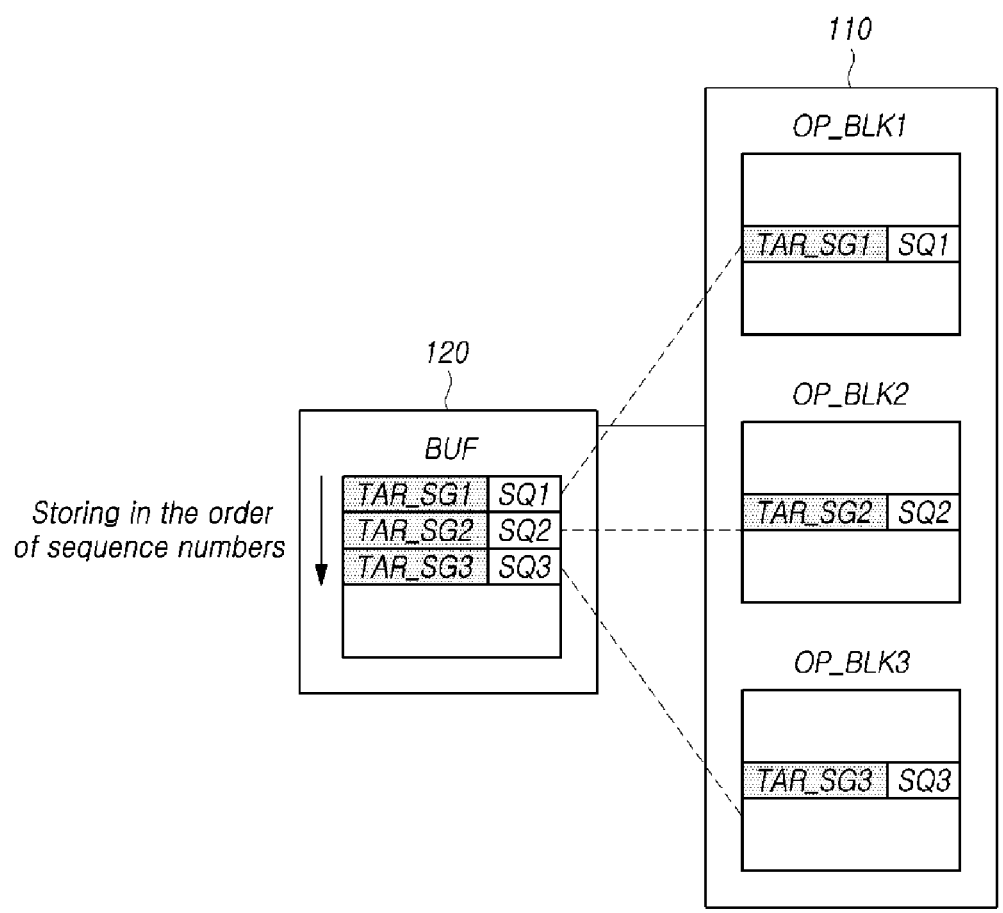
FIG. 10 illustrates a method of storing a plurality of target segments in a buffer by a memory system according to embodiments of the present disclosure.

FIG. 10 illustrates a method of storing a plurality of target segments in a buffer BUF by a memory system 100 according to embodiments of the present disclosure.

Referring to FIG. 10, the memory controller 120 of the memory system 100 may include the buffer BUF for temporarily storing a plurality of target segments. The buffer BUF, for example, may be located on a working memory 125 included in the memory controller 120 or on a separate volatile memory (e.g., SRAM) included in the memory controller 120.

The memory controller 120 may store the target segments TAR_SG1, TAR_SG2 and TAR_SG3 in the buffer BUF in an order of the sequence numbers SQ1, SQ2, and SQ3 for the target segments TAR_SG1, TAR_SG2, and TAR_SG3. Then, the memory controller 120 may write, to the target memory block TAR_BLK, the target segments TAR_SG1, TAR_SG, TAR_SG3 recently written to the open memory blocks OP_BLK1, OP_BLK2, and OP_BLK3.

Figure 11:
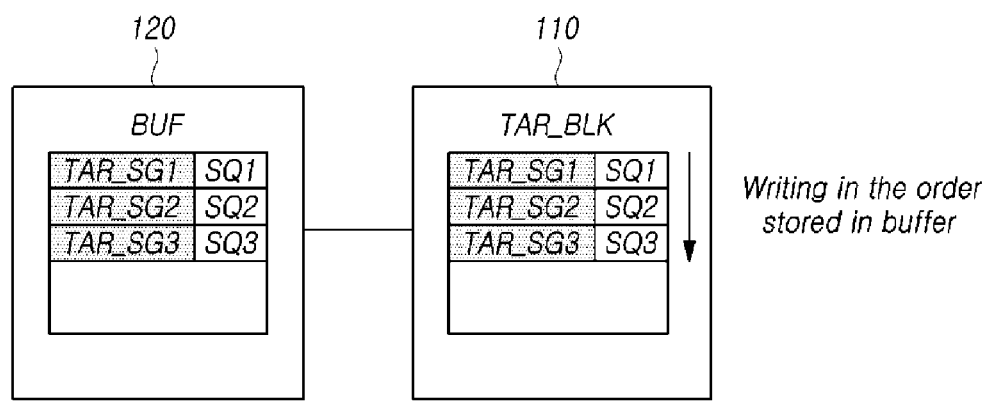
FIG. 11 illustrates an operation in which a memory system writes a plurality of target segments stored in the buffer described with reference to FIG. 10 to a target memory block according to embodiments of the present disclosure.

FIG. 11 illustrates an operation in which a memory system 100 writes a plurality of target segments stored in the buffer BUF described with reference to FIG. 10 to a target memory block TAR_BLK according to embodiments of the present disclosure.

Referring to FIG. 11, the memory controller 120 of the memory system 100 may write data stored in the buffer BUF to the target memory block TAR_BLK in the order of being stored in the buffer BUF.

As described in FIGS. 10 and 11, the memory controller 120 may once store a plurality of target segments in the buffer BUF, and store the target segments stored in the buffer BUF again in the target memory block TAR_BLK. The reasons for this configuration are as follows.

In the case that a sudden power-off occurs, a target segment, which is a segment recently written in the open memory block, may be in an unstable state due to the effect of the sudden power-off. In this situation, there may occur an error in the process of directly writing the target segment to the target memory block TAR_BLK.

Accordingly, the memory controller 120 may store the target segment in the buffer BUF once, and then write the target segment again to the target memory block TAR_BLK after removing the effect of the sudden power-off.

Figure 12:
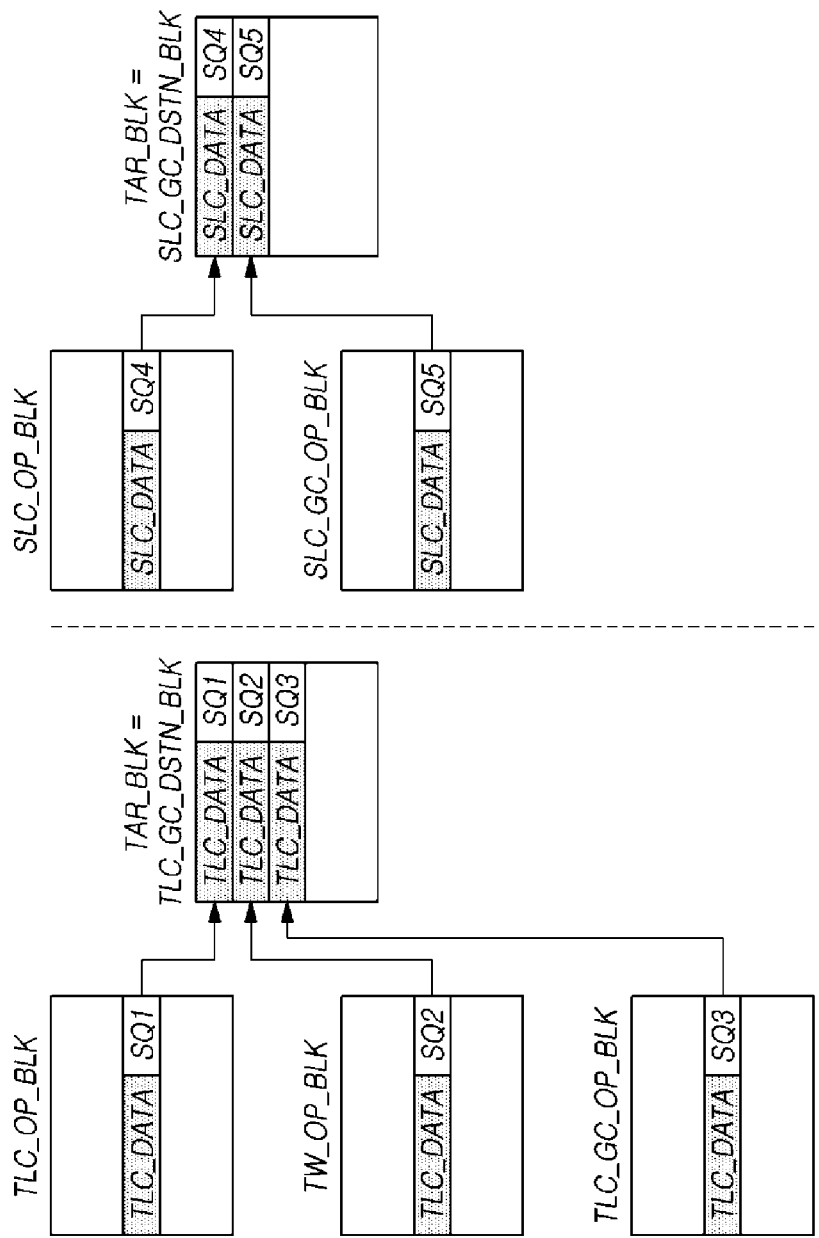
FIG. 12 illustrates an example of an operation in which the memory system writes target segments to a target memory block in consideration of a sequence number and data type according to embodiments of the present disclosure.

FIG. 12 illustrates an example of an operation in which the memory system 100 writes target segments to a target memory block in consideration of a sequence number and data type according to embodiments of the present disclosure.

Referring to FIG. 12, the memory controller 120 of the memory system 100 may determine the target memory block according to the data type of a target segment.

The target memory block may vary according to the data types of target segments.

Hereinafter, in an embodiment of the present disclosure, the data types of a segment include single-level cell data SLC_DATA and triple-level cell data TLC_DATA. In this case, the single-level cell data SLC_DATA may be written to the single-level cell, and the triple-level cell data TLC_DATA may be written to the triple-level cell.

In addition, in an embodiment of the present disclosure, a garbage collection destination block includes a single-level cell-only garbage collection destination block SLC_GC_DSTN_BLK and a triple-level cell-only garbage collection destination block TLC_GC_DSTN_BLK. Further, in an embodiment of the present disclosure, the single-level cell-only garbage collection destination block SLC_GC_DSTN_BLK is a single-level cell block, and the triple-level cell-only garbage collection destination block TLC_GC_DSTN_BLK is a triple-level cell block.

The type of each of the open memory blocks included in the memory device 110 may vary according to its use. For example, the type of the open memory block may include an enhanced memory block, a boot memory block, a replay protection memory block (RPMB), a normal data memory block, a turbo write memory block, or the like.

In this case, it may be required to manage a specific type of open memory block using a specific memory block. For example, the enhanced memory block, the boot memory block, and the reply protection memory block may be single-level cell blocks.

Since the triple-level cell data TLC_DATA and the single-level cell data SLC_DATA have different sizes corresponding to specific logical block addresses, they are required to be treated separately.

In FIG. 12, the memory controller 120 may write the target segments for a triple-level cell open block TLC_OP_BLK, a turbo write open block TW_OP_BLK and a triple-level cell garbage collection open block TLC_GC_OP_BLK to the triple-level cell garbage collection destination block TLC_GC_DSTN_BLK. That is, the memory controller 120 may set the target memory block TAR_BLK as the triple-level cell garbage collection destination block TLC_GC_DSTN_BLK with respect to the triple-level cell open block TLC_OP_BLK, the turbo write open block TW_OP_BLK, and the triple-level cell garbage collection open block TLC_GC_OP_BLK. This is because the data types of target segments for the triple-level cell open block TLC_OP_BLK, the turbo write open block TW_OP_BLK, and the triple-level cell garbage collection open block TLC_GC_OP_BLK are triple-level cell data TLC_DATA.

On the other hand, the memory controller 120 may write the target segments for a single-level cell open block SLC_OP_BLK and a single-level cell garbage collection open block SLC_GC_OP_BLK to the single-level cell garbage collection destination block SLC_GC_DSTN_BLK. That is, the memory controller 120 may set the target memory block TAR_BLK as the single-level cell garbage collection destination block SLC_GC_DSTN_BLK with respect to the single-level cell open block SLC_OP_BLK and the single-level cell garbage collection open block SLC_GC_OP_BLK. This is because the data types of target segments for the single-level cell open block SLC_OP_BLK and the single-level cell garbage collection open block SLC_GC_OP_BLK are single-level cell data SLC_DATA.

The memory controller 120 may use the triple-level cell garbage collection destination block TLC_GC_DSTN_BLK for data stored in the triple-level cell, and may use the single-level cell garbage collection destination block SLC_GC_DSTN_BLK for data stored in the single-level cell.

The relationship between the data type of the target segment and the target memory block corresponding to the data type of the target segment may vary according to the implementation of the memory system 100.

Figure 13:
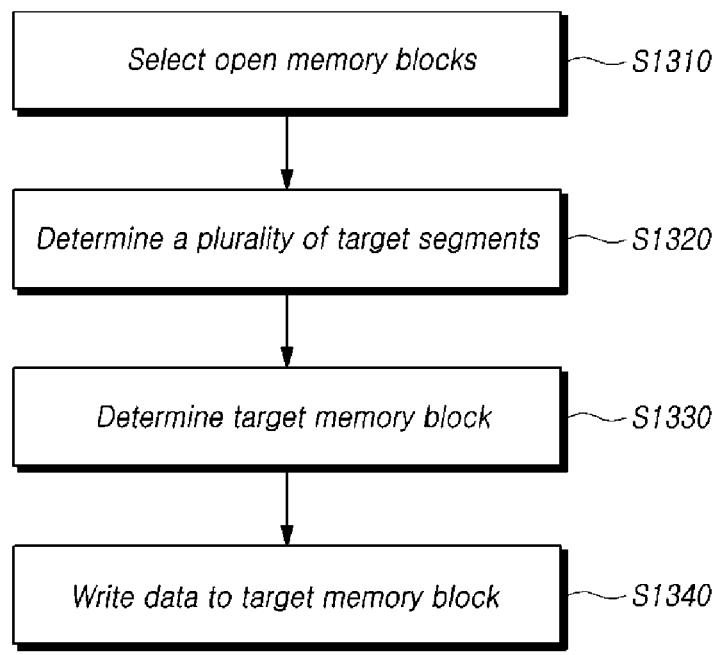
FIG. 13 illustrates an operating method of a memory system according to embodiments of the present disclosure.

FIG. 13 illustrates an operating method of a memory system 100 according to embodiments of the present disclosure.

Referring to FIG. 13, an operating method of the memory system 100 may include selecting a plurality of open memory blocks from among a plurality of memory blocks when a sudden power-off recovery operation is performed (S1310). In this case, one or more segments may be written to each of the plurality of open memory blocks.

The operating method of the memory system 100 may include determining a plurality of target segments, which are segments most recently written to each of the plurality of open memory blocks selected in S1310 (S1320).

In addition, the operating method of the memory system 100 may include determining a target memory block for writing the plurality of target segments from among the plurality of memory blocks (S1330).

In this case, the target memory block may be set, for example, as a garbage collection destination block, which is a target to which valid data is written when performing a garbage collection operation.

The operating method of the memory system 100 may include writing the plurality of target segments to the target memory block (S1340).

In this case, in the writing of the plurality of target segments to the target memory block (S1340), the plurality of target segments may be written to the target memory block according to an order of sequence numbers assigned to each target segment. In this case, a sequence number for each of the plurality of target segments may be assigned according to the order in which each target segment is written to the memory device 110.

In some embodiments, the operating method of the memory system 100 may further include writing dummy data to each of the plurality of open memory blocks.

In this case, the operation of writing the dummy data to each of the plurality of open memory blocks may include, 1) checking a target word line corresponding to a target segment for each of the plurality of open memory blocks, 2) checking whether there is a subsequent word line to the target word line, and 3) writing dummy data to a subsequent segment that is a segment corresponding to the subsequent word line when there is a subsequent word line with respect to the target word line.

Figure 14:
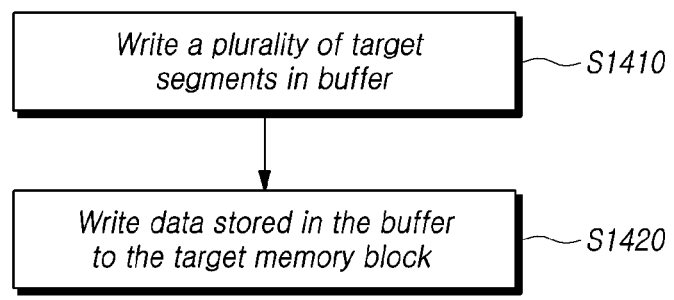
FIG. 14 is a flowchart illustrating an example of an operation of writing a plurality of target segments to a target memory block according to embodiments of the present disclosure.

FIG. 14 is a flowchart illustrating an example of an operation of writing a plurality of target segments to a target memory block according to embodiments of the present disclosure.

Referring to FIG. 14, writing the plurality of target segments to the target memory block may include writing the plurality of target segments in a buffer in the order of sequence numbers assigned to each target segment (S1410).

In addition, the method may include writing data stored in the buffer to the target memory block (S1420).

Figure 15:
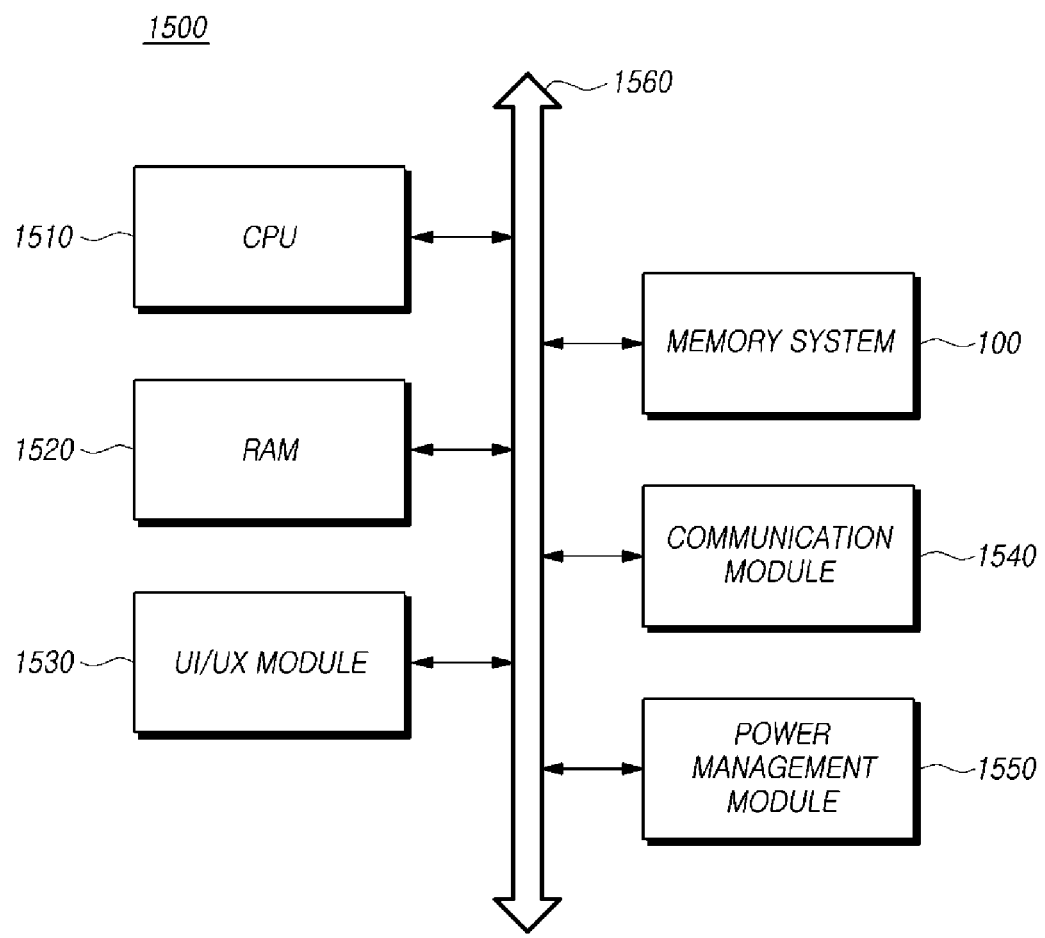
FIG. 15 illustrates the configuration of a computing system based on some embodiments of the disclosed technology.

FIG. 15 is a diagram illustrating the configuration of a computing system 1500 based on an embodiment of the disclosed technology.

Referring to FIG. 15, the computing system 1500 may include: a memory system 100 electrically connected to a system bus 1560; a central processing unit (CPU) 1510 configured to control the overall operation of the computing system 1500; a random access memory (RAM) 1520 configured to store data and information related to operations of the computing system 1500; a user interface/user experience (UI/UX) module 1530 configured to provide the user with a user environment; a communication module 1540 configured to communicate with an external device as a wired and/or wireless type; and a power management module 1550 configured to manage power used by the computing system 1500.

The computing system 1500 may be a personal computer (PC) or may include a mobile terminal such as a smartphone, a tablet or various electronic devices.

The computing system 1500 may further include a battery for supplying an operating voltage, and may further include an application chipset, a graphic-related module, a camera image processor, and a DRAM. Other elements would be apparent to a person skilled in the art.

The memory system 100 may include not only a device configured to store data in a magnetic disk such as a hard disk drive (HDD), but also a device configured to store data in a nonvolatile memory such as a solid state drive (SSD), a universal flash storage device, or an embedded MMC (eMMC) device. The non-volatile memory may include a read only memory (ROM), a programmable ROM (PROM), an electrically programmable ROM (EPROM), an electrically erasable and programmable ROM (EEPROM), a flash memory, a phase-change RAM (PRAM), a magnetic RAM (MRAM), a resistive RAM (RRAM), a ferroelectric RAM (FRAM), and the like. In addition, the memory system 100 may be implemented as storage devices of various types and mounted inside various electronic devices.

Based on embodiments of the disclosed technology described above, the operation delay time of the memory system may be advantageously reduced or minimized. In addition, based on an embodiment of the disclosed technology, an overhead occurring in the process of calling a specific function may be advantageously reduced or minimized. Although various embodiments of the disclosed technology have been described with particular specifics and varying details for illustrative purposes, those skilled in the art will appreciate that various modifications, additions and substitutions may be made based on what is disclosed or illustrated in the present disclosure and the following claims. Furthermore, the embodiments may be combined to form additional embodiments.

What is claimed is:

1. A memory system comprising:
   a memory device including a plurality of memory blocks; and
   a memory controller for controlling the memory device, and configured to select, when performing a sudden power-off recovery operation, a plurality of open memory blocks from among the plurality of memory blocks, wherein one or more segments are written to each of the plurality of open memory blocks, and write a plurality of target segments to a target memory block among the plurality of memory blocks, the plurality of target segments being segments most recently written to each of the plurality of open memory blocks.

2. The memory system of claim 1, wherein the memory controller determines the target memory block as a garbage collection destination block which is a target to which valid data is written when a garbage collection operation is performed.

3. The memory system of claim 1, wherein the memory controller writes, when performing the sudden power-off recovery operation, dummy data to each of the plurality of open memory blocks.

4. The memory system of claim 1, wherein the memory controller writes the plurality of target segments to the target memory block based on an order of sequence numbers assigned to each of the plurality of target segments according to an order in which each of the plurality of target segments is written to the memory device.

5. The memory system of claim 4, wherein the memory controller writes a sequence number for each of the plurality of target segments in a metadata area located on a spare area of the memory device.

6. The memory system of claim 4, wherein the memory controller comprises a buffer for storing the plurality of target segments, and
wherein the memory controller stores the plurality of target segments in the buffer in the order of the sequence numbers, and then writes the plurality of target segments stored in the buffer to the target memory block according to an order stored in the buffer.

7. The memory system of claim 1, wherein the memory controller determines the target memory block according to data types of the plurality of target segments.

8. The memory system of claim 7, wherein the memory controller determines the target memory block as a single-level cell garbage collection destination block when the data types of the plurality of target segments are single-level cell data, and determines the target memory block as a triple-level cell garbage collection destination block when the data types of the plurality of target segments are triple-level cell data.

9. An operating method of a memory system including a memory device having a plurality of memory blocks, the operating method comprising:
selecting, when performing a sudden power-off recovery operation, a plurality of open memory blocks from among the plurality of memory blocks, wherein one or more segments are written to each of the plurality of open memory blocks;
determining a plurality of target segments, which are segments most recently written to each of the plurality of open memory blocks;
determining, from among the plurality of memory blocks, a target memory block to which the plurality of target segments are to be written; and
writing the plurality of target segments to the target memory block.

10. The operating method of claim 9, wherein the target memory block is determined as a garbage collection destination block which is a target to which valid data is written when a garbage collection operation is performed.

11. The operating method of claim 9, further comprising writing dummy data to each of the plurality of open memory blocks.

12. The operating method of claim 9, wherein the writing of the plurality of target segments comprises writing the plurality of target segments to the target memory block based on an order of sequence numbers assigned to each of the plurality of target segments according to an order in which each of the plurality of target segments is written to the memory device.

13. The operating method of claim 12, wherein a sequence number for each of the plurality of target segments is written in a metadata area located on a spare area of the memory device.

14. The operating method of claim 12, wherein the writing of the plurality of target segments comprises:
storing the plurality of target segments in a buffer for storing the plurality of target segments in the order of the sequence numbers; and
writing the plurality of target segments stored in the buffer to the target memory block in an order stored in the buffer.

15. The operating method of claim 9, wherein the target memory block is determined according to data types of the plurality of target segments.

16. The operating method of claim 15, wherein the target memory block is determined as a single-level cell garbage collection destination block when the data types of the plurality of target segments are single-level cell data, and the target memory block is determined as a triple-level cell garbage collection destination block when the data types of the plurality of target segments are triple-level cell data.

17. A memory system comprising:
a memory device including a plurality of memory blocks; and
a controller coupled to the memory device and configured to:
select a plurality of open memory blocks from among the plurality of memory blocks, each open memory block being a memory block storing one or more segments, each segment having a sequence number indicating a storing order in the plurality of memory blocks;
determine a plurality of target segments from the plurality of open memory blocks, respectively, based on sequence numbers thereof, each target segment having a latest sequence number indicating most recently stored segments among one or more segments stored in a corresponding open memory block;
select a target memory block from among the plurality of memory blocks, the target memory block being a garbage collection destination block; and
write the plurality of target segments to the target memory block based on an order of sequence numbers.

* * * * *